March 21, 1939. H. E. HARTIG 2,151,203
FLUID METER AND METHOD OF MEASURING THE RATE OF FLOW OF FLUIDS
Filed Dec. 23, 1935 2 Sheets-Sheet 1
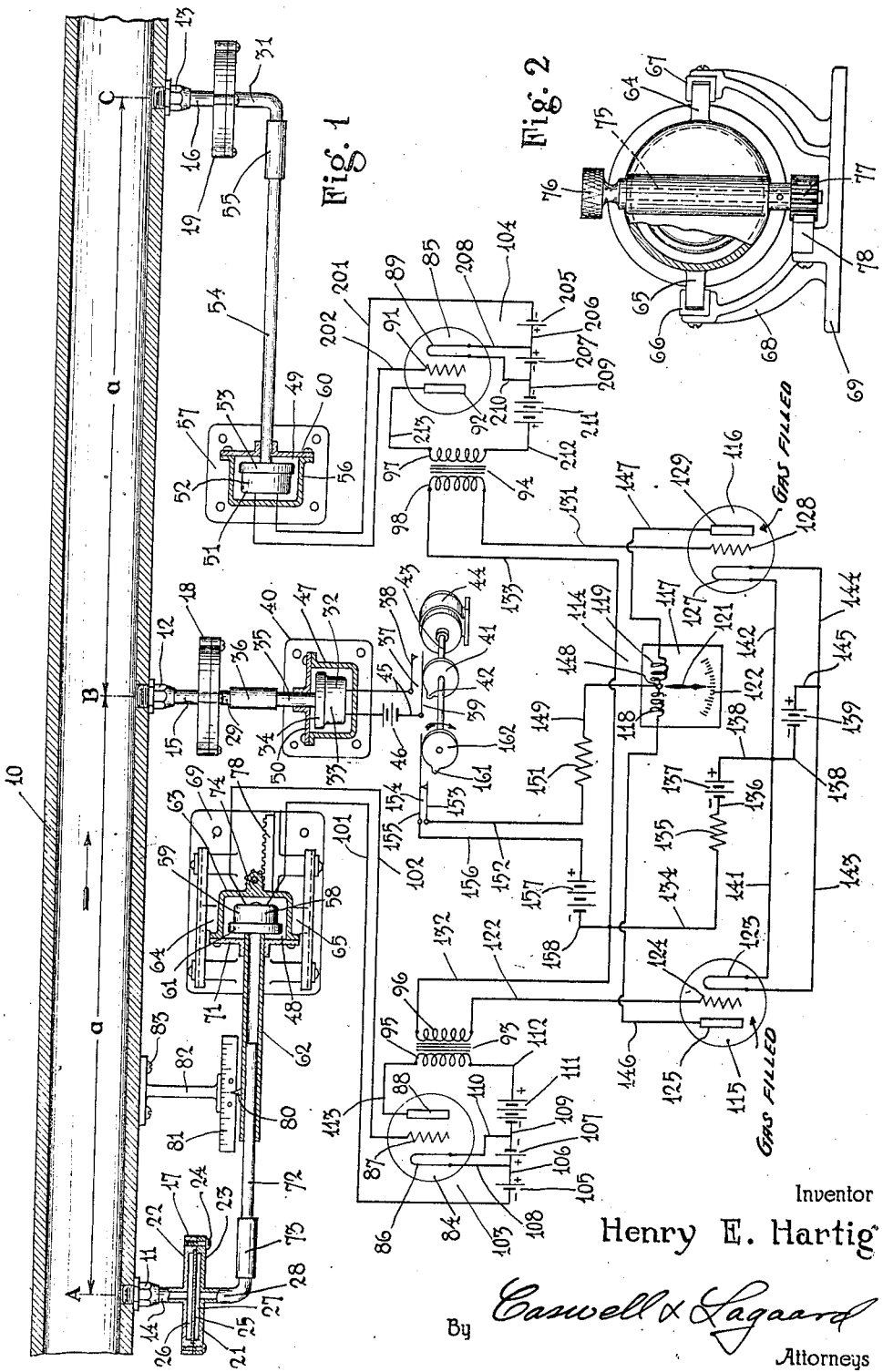
Inventor
Henry E. Hartig
By Caswell & Lagaard
Attorneys March 21, 1939.  H. E. HARTIG  2,151,203
FLUID METER AND METHOD OF MEASURING THE RATE OF FLOW OF FLUIDS
Filed Dec. 23, 1935  2 Sheets-Sheet 2

Inventor
Henry E. Hartig
By Caswell & Lagaard
Attorneys

Patented Mar. 21, 1939

2,151,203

UNITED STATES PATENT OFFICE

2,151,203

FLUID METER AND METHOD OF MEASURING THE RATE OF FLOW OF FLUIDS

Henry E. Hartig, Robbinsdale, Minn., assignor of one-half to Hugh B. Wilcox, Minneapolis, Minn.

Application December 23, 1935, Serial No. 55,852

10 Claims. (Cl. 73—194)

My invention relates to fluid meters and to the method of measuring the rate of flow of fluids and has for an object to provide an exceedingly practical and accurate apparatus and method for accomplishing the desired result.

An object of the invention resides in providing an apparatus and method by means of which accurate results can be obtained unaffected by reflections of the vibrations produced by the conduit in which the fluid flows.

Another object of the invention resides in providing a method of measuring the rate of flow of fluids which utilizes the time required for the wave front of mechanical vibrations initiated in the fluid to reach a certain locality in the fluid.

A still further object of the invention resides in providing a method of measuring the rate of flow of fluids in which comparison is made between the times required for vibrations initiated in the fluid to travel certain distances along different paths.

Another object of the invention resides in providing a method of measuring the rate of flow of fluids in which comparison is made between the lengths of the paths along which the vibrations travel in the same length of time.

An object of the invention resides in providing a method for measuring the rate of flow of fluids in which comparison is made between the time required for vibrations to travel along a path in the fluid, whose rate of flow is to be measured, and along another path in a fluid whose state of motion and inherent characteristics are known.

Another object of the invention resides in providing a method for measuring the rate of flow of fluids in which comparison is made between the separate time intervals required for vibrations to travel along paths in the fluid whose rate of flow is to be measured extending in the direction of flow of the fluid and in the opposite direction.

A still further object of the invention resides in providing a fluid meter having means for initiating in the fluid mechanical vibrations and other means rendered operable upon the arrival of the vibrations at certain localities in the fluid.

Another object of the invention resides in providing one or more detecting devices capable of being actuated upon the arrival of a wave front at said devices.

An object of the invention resides in providing indicating means adapted to indicate priority of arrival of a wave front at either of two localities.

Another object of the invention resides in providing a fluid meter utilizing two detecting devices in which one of the detecting devices is prevented from operating when the other detecting device has been actuated.

A still further object of the invention resides in providing a fluid meter in which the rate of flow of the fluid is determined by comparing the distances traveled in the same time by the vibrations over two different paths in the fluid.

Another object of the invention resides in constructing the meter with two gas filled triode tubes having parallel plate circuits and a common return to the filaments and in utilizing in said common return a resistance and a source of E. M. F.

A still further object of the invention resides in employing devices similar to telephone receivers as vibration detecting devices and in connecting said devices in the grid circuits of said tubes.

Other objects of the invention reside in the novel combination and arrangement of parts and in the details of construction hereinafter illustrated and/or described.

In the drawings:

Fig. 1 is a partly diagrammatic view of a fluid meter embodying my invention.

Fig. 2 is an end elevational view of the adjustable vibration detecting device shown in Fig. 1, illustrating a portion in section.

Figure 3:
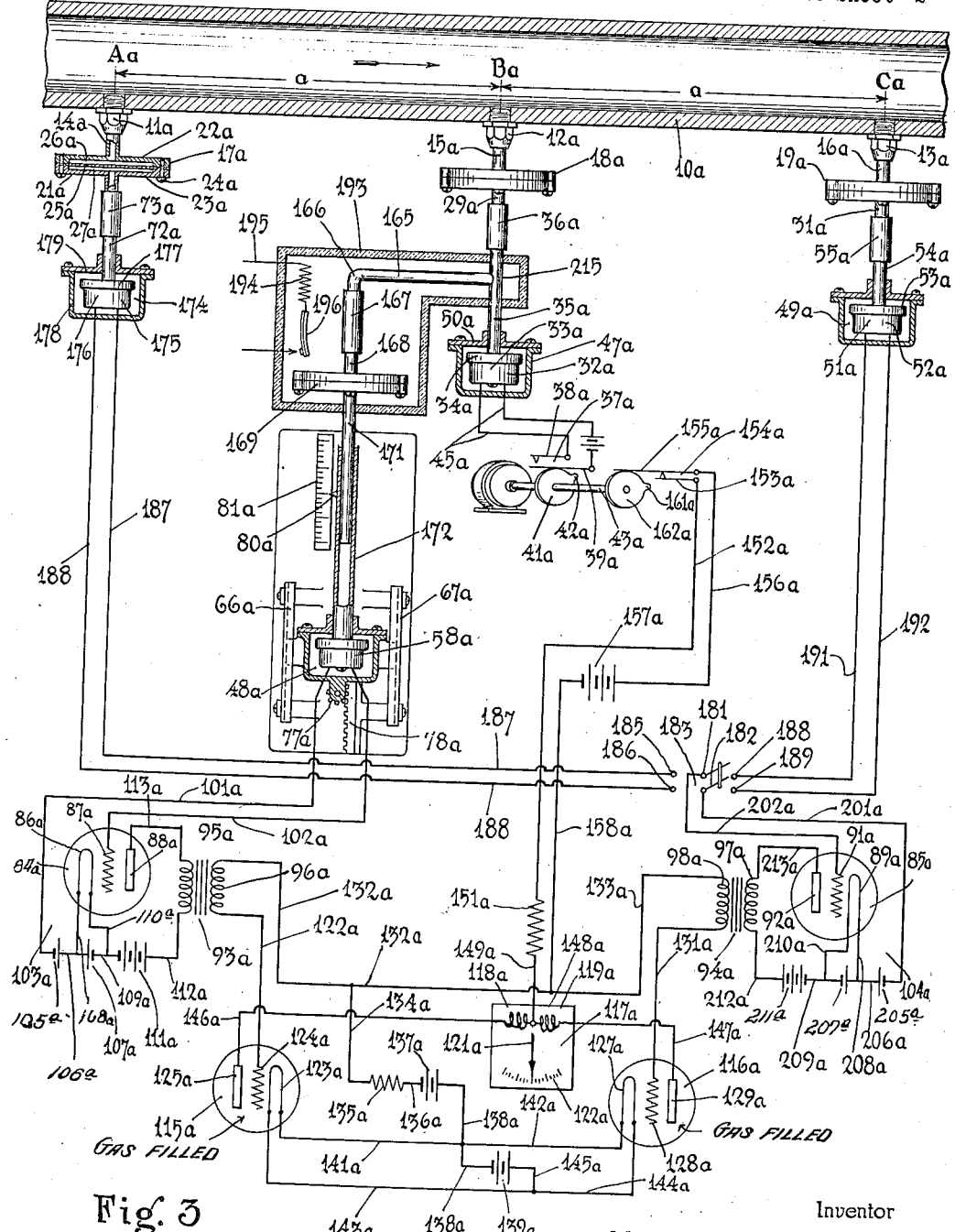
Fig. 3 is a view similar to Fig. 1 showing a modification of the invention.

In the form of the invention illustrated in Figs. 1 and 2 a portion of the conduit through which the fluid whose velocity to be measured is shown and indicated by the reference numeral 10. This conduit is of sufficient length, being from one foot long and over and is tapped at three equally spaced localities designated by the reference characters A, B and C and which are subsequently referred to in the specification as stations. The distance between these localities or stations is designated by the reference numeral a. At stations A, B and C are located three pipe fittings 11, 12 and 13 which are screwed into the conduit 10 and which communicate therewith. These fittings have attached to them short tubes 14, 15 and 16 which are connected to vibration transmitting devices 17, 18 and 19. All of these devices being identical, only the device 17 will be described in detail which is shown in section in Fig. 1.

The vibration transmitting device 17 comprises a case 21 which is constructed in two halves 22 and 23 secured together by means of machine screws 24. The case 21 is divided at its center by means of a diaphragm 25 which is clamped between the two halves 22 and 23 and which forms two chambers 26 and 27 within said case on opposite sides of the diaphragm. Chamber 26 is in communication with the interior of the conduit 10 through the tube 14 and pipe fitting 11, said tube 14 being connected to the half 22 of said case. In a similar manner another tube 28 is connected to the half 23 of case 21. The function of this tube will be presently described in detail. The vibration transmitters 18 and 19 are similarly constructed and have tubes 29 and 31 connected to the same in the same manner as the tube 28 is connected to the half 23 of case 21.

Vibrations are initiated in the conduit 10 at station B and are detected at stations A and C. The apparatus for initiating vibrations at station B comprises a device 32 in the nature of a telephone receiver which is constructed with an electro-magnet and a diaphragm adapted to be attracted thereby when an electric current passes through the coil of the electro-magnet. Such construction being well known in the art, has not been shown in detail. All of these parts are contained within a case 33 which is provided with a cap 34 screwed upon said case. Cap 34 has secured to it a tube 35 which is connected by means of a flexible hose 36 with tube 29 of transmitter 18. This brings the chamber on one side of the diaphragm of telephone receiver 32 in communication with the chamber 27 of transmitting device 18. It will be readily comprehended that as the diaphragm of telephone receiver 32 vibrates the column of fluid between said diaphragm and the diaphragm 25 of transmitter 18 is set into vibration. This sets up vibrations in the diaphragm 25 of said transmitter which in turn sets up vibrations in the column of fluid in tube 15 and also the fluid in the conduit 10 whose rate of flow is to be measured.

For the purpose of operating the receiver 32, a switch mechanism is employed which is indicated in its entirety by the reference numeral 37. This switch mechanism includes two switch leaves 38 and 39 which are normally spread apart to open the switch and which are adapted to be closed by means of a cam 41 having a lug 42 thereon adapted to engage the leaf 39 and to move said leaf into engagement with leaf 38. Cam 41 is mounted upon the armature shaft 43 of an electric motor 44 which is driven by any suitable source of current, not shown in the drawings. The switch 37 is connected in a circuit 45 which is connected to the telephone receiver 32 and which has in it a battery 46 or other suitable source of electro-motive force. The telephone receiver 32 is enclosed within a housing 47 which is mounted on a base 40. Said housing has attached to it a closure 50 which receives the tube 35 and which supports the telephone receiver 32 with respect to said housing. Base 40 may be secured to any suitable support and holds the receiver in proper position. The hose 36 prevents vibrations set up in the housing 47 from being transmitted to the transmitter 18 and confines the vibrations solely to those set up by the diaphragm of the telephone receiver.

At the stations A and C and connected to the two transmitters 17 and 19 are two vibration detecting devices 48 and 49. The vibration detecting device 49 comprises a telephone receiver 51 provided with a case 52 in which the diaphragm, electro-magnet and other parts are disposed. This case is closed by means of a cap 53. The diaphragm of said receiver is clamped between said cap and case. The cap 53 is connected to a tube 54 which is turn is connected to tube 31 by means of a flexible hose 55. Telephone receiver 51 is mounted in a housing 56 similar to the housing 47 which is carried on a base 57. A closure 60 closes the housing 56 and receives the tube 54 by means of which the receiver 51 is supported within said housing 56.

The vibration detecting device 48 is similar to the device 49 and consists of a telephone receiver 58 which is constructed with a case 59, and a cap 61 and the other usual parts contained within said case. A tube 62 is connected to the cap 61 while the entire receiver is mounted within a housing 63. A closure 71 is attached to housing 63 which closure receives the tube 62 whereby the telephone receiver 58 is supported within said housing 63. In this specification, the vibration detecting devices are illustrated and described as telephone receivers, though it can readily be comprehended that any other vibration detecting device such as a microphone may be used in place thereof if desired.

The vibration detecting device 48 is adjustably mounted in the following manner: Housing 63 is provided at its sides with two lugs 64 and 65 best shown in Fig. 2. These lugs are slidably received in two channel shaped guides 66 and 67 which are mounted on legs 68 carried by a base 69. By means of this construction housing 63 and the telephone receiver 59 carried thereby are slidably mounted with respect to the base 69, so that movement of the said telephone receiver in the direction of the length of tube 62 may be had.

For the purpose of sliding the receiver 58 with respect to the base 69, a boss 74 is formed at the rearward portion of the housing 63. In this boss is rotatably mounted a vertically extending shaft 75 best shown in Fig. 2. This shaft is provided at its upper end with a knob 76 by means of which the same may be rotated and at its lower end with a spur pinion 77. Pinion 77 meshes with a rack 78 secured to the base 69. Upon rotation of the shaft 75 by means of knob 76 the housing 63 and the telephone receiver 58 carried therein, can be reciprocated with respect to the base 69 and in the direction of the length of tube 62.

Telescoping with the tube 62 is another tube 72 which is connected to the tube 28 by means of a flexible hose 73. The tube 62 has secured to it a pointer 80 which is adapted to travel along a scale 81. Scale 81 is supported on a bracket 82 which may be attached directly to the conduit 10 by means of screws 83 or to any other suitable support as for instance a support on which the base 69 is mounted. Scale 81 may be calibrated to feet or fractions thereof or the same may be calibrated in the metric system. This scale indicates the exact movement of the telephone receiver 58.

In conjunction with the two vibration detectors 48 and 49 I employ two audio frequency amplifiers 103 and 104. The amplifier 103 comprises an audio frequency amplifying vacuum tube 84 and an audio frequency transformer 93 and the amplifier 104 comprises an audio frequency amplifying vacuum tube 85 and an audio frequency transformer 94. Any type of transformer and tube now well known in the art for the purpose may be employed. I have found that an RCA tube No. 201A will function efficiently and an ordinary audio frequency transformer of the iron core type with a three to one step-up ratio will operate effectively in conjunction with such tube.

The tube 84 has a filament 86, a grid 87 and a plate 88. Tube 85 is similarly constructed with a filament 89, a grid 91 and a plate 92. The transformer 93 has a primary 95 and a secondary 96, while the transformer 94 has a primary 97 and a secondary 98.

The electro-magnet of telephone receiver 58 of sound detecting device 48 has connected to it two conductors 101 and 102. Conductor 102 is directly connected to grid 87 of tube 84, while conductor 101 is connected to the negative side of a C battery 105. Another conductor 106 connects the plus side of the C battery 105 with the plus side of an A battery 107. This conductor is in turn connected by means of another conductor 108 with one side of the filament 86. Another conductor 109 connects the minus side of the A battery 107 with the minus side of a B battery 111. A conductor 110 connects the other side of the filament 86 with conductor 109 which as previously stated was connected to A battery 107. The plus side of the B battery 111 is connected by means of a conductor 112 with one side of the primary 95 of transformer 93, while the other side of said primary is connected by means of another conductor 113 with the plate 88.

The detecting device 49 is connected to the tube 85 and to the transformer 94 and to A, B and C batteries 207, 211 and 205 respectively, in the same manner as the detecting device 48 is connected to the tube 84 and its corresponding batteries and transformer. For this reason the description of these circuits will not be repeated and similar reference numerals will be used of a denomination of 100 higher than those used with amplifier 103 to designate the corresponding parts of the circuit of amplifier 104.

The two amplifiers 103 and 104 are connected to the detecting device of the invention which will now be described in detail and which is indicated in its entirety by the reference numeral 114. This device comprises two gas filled triode tubes 115 and 116 and a differential galvanometer 117. These tubes may be any of the tubes now well known in the art, which contain helium, neon or argon at a pressure of about one millimeter mercury. One of such tubes which I have found suitable is the RCA No. 885 tube. The triode tubes 115 and 116 similar to any other gas filled triode tube have the characteristic of failing to discharge plate current until the grid E. M. F. thereof reaches a certain critical value. The plate resistance then breaks down and plate current flows freely even with a subsequent reduction in grid E. M. F. until the plate circuit is opened, and the original conditions reestablished.

The galvanometer may be of any well known type and comprises two coils 118 and 119, which produce a magnetic field and in which a movable coil or a permanent magnet is disposed. Such coil or magnet is connected to a pointer 121 which moves along a scale 122. In the drawings this construction has been diagrammatically shown and for the sake of explanation it will be assumed that the pointer 121 moves to the right when the field is produced by coil 119 and to the left when produced by coil 118. The tube 115 is provided with a filament 123, a grid 124 and a plate 125, while the tube 116 is similarly provided with a filament 127, a grid 128 and a plate 129.

The secondary 96 of transformer 93 is connected by means of a conductor 122 with the grid 124 of tube 115. Similarly the secondary 98 of transformer 94 is connected by means of a conductor 131 with the grid 128 of tube 116. The other side of the secondary 96 of transformer 93 is connected by means of a conductor 132 to another conductor 133 which in turn is connected to the other side of the secondary 98 of transformer 94. These two conductors are connected to a third conductor 134 which is connected to a resistance 135. Resistance 135 is connected by means of a conductor 136 with the minus side of a C battery 137. The plus side of the C battery is connected by a conductor 138 to the minus side of an A battery 139. One side of each of the filaments 123 and 127 are connected together by means of two conductors 141 and 142 which are both connected to the conductor 138 and in this manner connected to the minus side of the A battery 139. The other sides of these filaments are connected together by means of conductors 143 and 144 which are further connected to a common conductor 145 which in turn is connected to the plus side of the A battery 139. The plate 125 of tube 115 is connected by means of a conductor 146 with coil 118 of galvanometer 117 while the plate 129 of tube 116 is similarly connected by means of a conductor 147 with the coil 119 thereof. These two coils are in turn connected together by means of a conductor 148 which has connected to it another conductor 149. Conductor 149 is further connected to a resistance 151. This resistance is preferably a non-inductive resistance and may have a value of approximately 1000 ohms. A conductor 152 extends between said resistance and one of the leaves 153 of a double pole leaf switch 154. The other leaf 155 of this leaf switch is connected by a conductor 156 to the plus side of a B battery 157 and the other side of said B battery is connected by a conductor 158 with the conductors 132, 133 and 134.

The leaf 155 of switch 154 extends outwardly beyond the end of the leaf 153 and is adapted to be moved to open switch 154 by means of a lug 161 formed on a cam 162 which is attached to shaft 43 of motor 44. The lug 161 is arranged with respect to the lug 42 on cam 41 so that switch 37 is first closed and thereafter switch 154 is opened. The function of switch 154 will be presently described in detail.

My invention functions as follows: Upon operation of motor 44, shaft 43 is rotated. When the lug 42 engages switch leaf 39, switch 37 is closed and the circuit 45 containing battery 46 and telephone receiver 33 is closed. This causes the diaphragm of said receiver to be attracted by the electro-magnet thereof and said diaphragm caused to vibrate. This sets up vibrations within case 32, the tubes 35, 36 and 29 and the chamber 27 of transmitter 18. The vibrations set up have a sharply defined wave front which produces vibrations of the diaphragm 25 of transmitter 18. The diaphragm 25 causes vibrations which travel from the transmitter 18 through tube 15, pipe fitting 12 and into the fluid in conductor 10. Vibrations in reaching the fluid travel from station B both to the left and right and finally reach stations A and C where the vibrations set up travel through fittings 11, tube 14 and chamber 26 to the diaphragm 25 of transmitter 17 and from station C through fitting 13, tube 16 and into chamber 26 of transmitter 19. The transmitter 17 similar to the transmitter 18 sets up vibrations in the column of air or other fluid contained in the chamber 27, tubes 28, 73, 72 and 62 and in the case 59 of telephone receiver 58. This causes the diaphragm of said telephone receiver to vibrate and to generate an E. M. F. in the electro-magnet thereof. In a similar manner transmitter 19 sets up vibrations which are transmitted through the fluid in tubes 31, 55 and 54 to the diaphragm of telephone receiver 52. In like manner, an E. M. F. is generated in the electromagnet of this receiver which causes currents to flow in the circuits connected therewith. The currents flowing in the circuits 101—102 and 201—202 pass through the amplifiers 103 and 104 and amplified currents of similar characteristics flow from the secondaries 96 and 98 of the transformers 93 and 94. It will be noted that the conductor 122 connected to the secondary 96 of transformer 93 is connected to grid 124 of tube 115 and that the conductor 132 is connected through C battery 137 by means of conductors 134, 138 and 141 with the filament 123 of said tube. The voltage of the C battery 137 and the voltage of the B battery 157 are appropriately selected so that a slight increase in grid E. M. F. of tube 115 will cause the tube resistance to break down and a discharge to occur through the plate circuit. Likewise the secondary 98 of transformer 94 is connected to the grid circuit of tube 116. Tube 116 being identical with tube 115 and having the same C battery and B battery, will correspondingly function when a suitable increase in grid E. M. F. is produced in its grid circuit. Since the two plate circuits of these tubes are connected to the coils 118 and 119 of the galvanometer 117, it will become evident that the galvanometer will move in one or the other direction, depending upon which of the tubes 115 and 116 is first actuated. The first tube actuated will be the one to first receive the E. M. F. generated in its grid circuit and produced by the wave front of the vibrations initiated by receiver 33.

After one of the tubes 115 or 116 has been actuated, it becomes necessary to prevent actuation of the companion tube. In the present invention the difference in time interval for the wave front to travel from transmitter 18 to either of transmitters 17 or 19 is exceedingly short and the galvanometer would have insufficient time to start to swing before the other tube became actuated and then no indication would be had. To avoid this resistances 151 and 135 are employed. Before plate current flows a practically infinite resistance exists between the plate and the filament of both of the tubes 115 and 116 which are in parallel. Since resistance 151 is small compared to the plate circuit resistance, the voltage drop is hence largely across the plate to filament of the two tubes. When the grid voltage of one of the tubes is increased, the plate to filament resistance of that tube is broken down and current then flows through the plate circuit of that particular tube. As soon as this current flows the voltage drop across the plate to filament resistance of both tubes drops since both tubes are in parallel. The resistance 151 is such that when one tube is actuated the voltage drop across the plate to filament of the other tube is sufficiently below the potential required to cause break down of the plate to filament resistance of said tube even when its grid E. M. F. is increased by an amount adequate to procure actuation of said tube under normal conditions. The companion tube hence fails to function when the first named tube has once been actuated. Resistance 135 functions in a manner to insure the same result causing a demand for greater grid voltage when the other tube has been actuated than would be required were the said tube not actuated. This further prevents actuation of the companion tube. Inasmuch as the operation of tubes of the class described is practically instantaneous, micrometric differences in time of arrival of the vibrations to the two receivers can be measured.

A characteristic of tubes 115 and 116 is that once the said tubes have been actuated, they continue to pass current until the plate voltage has been removed. It hence becomes necessary to open the plate circuits after each impulse. For this purpose cam 162 and lug 161 are used which raise switch leaf 155, opening switch 154 and breaking the common portion of the plate circuit comprising conductors 156 and 152. This has the effect of resetting the device and the system is thereafter again ready to indicate the prior arrival of the wave front of the vibrations at one of the two detecting devices 48 and 49.

Before measurement of the rate of flow of fluid through the conduit 10 can be accomplished, it becomes necessary to ascertain on the scale 81 the position of pointer 80 when the path from station B through A and to detecting device 48 is equal to that from stations B through C and to detecting device 49. This may be accomplished by actual measurement of distances or the same may be accomplished by operation of the instrument itself. In such case the conduit 10 is filled with any fluid and preferably the fluid whose velocity is to be measured or a similar fluid, and the said fluid maintained at rest. If the device is to be used for measuring the velocity of gases the same gas is preferably enclosed in conduit 10 and if it is impossible to procure the gas whose velocity is to be measured another gas may be used. The device is then manipulated as will be described in conjunction with the measurement of flow and the receiver 58 adjusted until the pointer 121 kicks equally as many times to one side as to the other. The position of pointer 80 on scale 81 when this occurs is the zero mark. When this mark has once been located it is unnecessary to further calibrate the instrument.

The method of measuring the flow of fluids is as follows: Assume that the fluid in conduit 10 is traveling from left to right and in the direction of the arrow. The vibrations traveling from station B to station C are hence traveling with the stream and a shorter length of time will be required for the wave front to reach detecting device 49. If the length of the path along which the vibrations travel from station B through station A and to detecting device 48 be reduced as compared to the path from station B through station C to detecting device 49, the time required for the wave front to travel over both paths can be made equal. By moving the receiver 58 along guides 66 and 67 by means of knob 76, pinion 77 and rack 78 such an adjustment can be procured. In operation each time the lugs 42 and 161 engage the respective spring leaves the pointer 121 of galvanometer 117 kicks to one side or to the other, depending upon which of the two detecting devices is first actuated. Due to the fact that the apparatus is extremely sensitive, slight variations in the flow of the fluid will cause the pointer to occasionally kick first to one side and then to the other side when the critical position is approached. The apparatus is first adjusted so that a position is found at which the pointer kicks the majority of the time to one side and said position noted. The paratus is then adjusted so that another position is found at which the pointer kicks a corresponding percentage of times to the other side. The space on scale 81 between these positions is bisected by the pointer 80 which indicates the position of said detecting device 48 at which the same length of time is required for the vibrations to travel over both paths.

Since the position of the pointer 80 with respect to scale 81 has already been determined when the two paths are equal and there is no flow, the difference in distances or the shortening of the path can be readily measured directly on the scale. Knowing this distance in feet and also knowing the rate of propagation of the vibrations through the particular fluid whose velocity is to be measured, the velocity can be readily computed by a formula, the derivation of which is as follows: Let $v$ equal the velocity of the fluid which is to be measured and $V$ equal the velocity of the propagation of the vibrations in the fluid when at rest. Let $a$ be the equal distances between stations A and B, and B and C, and $s$ be the distance between the zero position of the pointer 80 and the position found as above described. The time interval required for the vibrations to travel from station B to station A is $$\frac{a}{V+v}$$

and the time interval required for the vibrations to travel from station B to station C is $$\frac{a}{V+v}$$

Since tubes 28, 73, 72, 62, 54, 55 and 31 are closed and no flow occurs through the same and since the detecting devices 48 and 49 are identical and also transmitters 17 and 19, the travel of the vibrations through the fluid in these parts is unaffected by the flow of the fluid in the conduit. It hence follows that $$\frac{s}{V}=\frac{a}{V-v}-\frac{a}{V+v}$$

from which $$\frac{s}{V}=\frac{2av}{V^2-v^2}$$

Where the gas whose flow is to be measured is air, $V$ is approximately 1100 feet per second and since $v$ is generally less than 110 feet per second, the error made in neglecting $v^2$ in the above formula would be 1% or less. Omitting $v^2$ the formula then becomes $$\frac{s}{V}=\frac{2av}{V^2}$$

and solving $$v=\frac{Vs}{2a}$$

Where the fluid whose velocity to be measured is not air it may be assumed that the velocity of propagation of the vibrations in the medium is $U$. In such case the formula becomes $$\frac{s}{V}=\frac{2av}{U^2} \text{ or } v=\frac{sU^2}{2aV}$$

It will thus be seen that the velocity of the fluid can be readily determined from the proper formula when the distance $s$ on the scale 81 has been determined.

In Fig. 3 I have shown a modification of the invention by means of which it becomes unnecessary to determine the rate of propagation of the vibrations in the fluid whose rate of flow is to be measured. This is highly desirable where the fluid is of a complex nature such as illuminating or natural gas or some other similar substance. In this form of the invention a number of the parts are similar to those of the other form of the invention and the description thereof will not be repeated. These parts will be designated by similar reference characters with the suffix $a$ applied thereto.

In this form of the invention conduit 10a is employed which has connected to it transmitters 10 17a, 18a and 19a, at stations Aa, Ba and Ca the same as in the other form of the invention. This system differs in that the scale 81 and sliding tube 62 of the form of the invention shown in Fig. 1 are not used with the transmitter 17a. Instead another detecting device 174 is employed which is identical with the detecting device 49a. This detecting device comprises a receiver 175 constructed with a case 176 and a cap 177 to which the tube 72a is attached. This receiver is enclosed within a housing 178 which is covered with a cap 179 through which the tube 72a extends and by means of which the receiver is supported. In this form of the invention the tubes associated with transmitter 17a and detecting device 174 and with transmitter 19a and detecting device 49a are extremely short and of equal dimensions.

The transmitter 18a as in the other form of the invention is connected to a tube 29a which is in turn connected to another tube 35a by means of a hose 36a. Tube 35a is connected to the receiver 32a the same as before. Tube 35a is, however, considerably longer than tube 35 and has attached to it at 215 a branch tube 165 which is formed with an elbow 166 and which in turn is connected to a hose 167. Hose 167 is connected to another tube 168 which is connected to a transmitter 169 identical with transmitter 17a. This transmitter is in turn connected to a tube 171 which is similar to tube 72 and which is slidably mounted in another tube 172. Tube 172 is connected to a detecting device 48a which is identical with the detecting device 48 and which is constructed with a receiver 58a slidably mounted in guides 66a and 67a, the same as receiver 58. This receiver is further operated through a rack 78a and a pinion 77a in identically the same manner. Associated with the tube 172 is a pointer 80a and a scale 81a which serve the same purpose as the pointer 80 and scale 81.

The two amplifiers used with the form of the invention shown in Fig. 3 are identical with the amplifiers shown in Fig. 1 and are designated by the reference numerals 103a, 104a. The two conductors 101a and 102a of amplifier 103a are connected to the electro-magnet of the receiver 58a. The two conductors 201a and 202a are, however, connected to the blades 181 and 182 of a double pole double throw knife switch 183. Two of the poles 185 and 186 of this switch are connected to conductors 187 and 188 which are in turn connected to the electro-magnet of telephone receiver 175. In a similar manner the other poles 188 and 189 of switch 183 are connected by means of conductors 191 and 192 with the telephone receiver 51a of detecting device 49a. In throwing the switch 183 one way or the other, either of the detecting devices 49a or 174 can be connected to the system.

In the use of the form of the invention shown in Fig. 3, it is necessary to maintain the temperature of the fluid in tubes 165, 167 and 168, and in the transmitter 169 constant. For this purpose these parts are enclosed in an insulated housing 193 and a heating coil 194 is disposed within this housing which is energized by a circuit 195. In this circuit is a thermostatic electric switch 196 which controls the energization of heating coil 194 and which maintains a constant temperature in the chamber formed within housing 193.

The device for setting up the vibrations is identical with that described in conjunction with the form of the invention shown in Fig. 1 and likewise the remainder of the system.

The method of calibrating this form of the invention is similar to that of the other form of the invention. The switch 183 is first thrown to the left and the zero mark on scale 81a determined as previously described. This gives the zero reading when the vibrations travel in the direction of station Aa. The switch 183 is then thrown to the right and the zero mark on scale 81a again determined. These zero marks should coincide since both of the paths via station Aa and Ca are intended to be equal. Since distance a can be easily and accurately measured any variation would be caused by differences in the lengths of the remainders of the two paths. This can be adjusted by sliding tube 54a with respect to hose 55a, so that the two zero marks can be made to coincide. The paths are then exactly of the same length. The time required for the vibrations to travel from the source through station Ba through station Aa and to receiver 174 is equal to the time required for the vibrations to travel from the source through tubes 165, 168 and 167 to the receiver 58a. Since the ambient temperature of the tubes 165, 166 and 167, and the transmitter 169 is maintained constant and since a fluid such as air or any other desired fluid may be enclosed within this part of the system, the rate of propagation in which is known, the time required for vibrations to travel along this path can be accurately determined. Scale 81a is hence preferably calibrated to read directly in seconds or fractions of a second instead of in feet.

In the actual use of the instrument switch 183 is first thrown to one side and a reading procured in the manner previously described with the fluid flowing through conduit 10a. The switch 183 is then thrown to the other side and a second reading procured under similar conditions. By means of these two readings and the time required for the vibrations to travel along the path through tubes 165, 167, 168 etc. the rate of flow of the fluid in conduit 10a can be determined by a formula which is derived as follows:

Assume that the flow of the fluid is in the direction of the arrow, from Aa to Ca, and that the movement of the pointer 80a from its zero mark when switch 183 is thrown to the left and right respectively is represented by the symbol X and Y. The time X consists of two parts. The first is that required for the vibrations to travel between the stations Aa and Ba. This part of the time X is equal to $$\frac{a}{V-v}$$

Where V is the rate of propagation of the vibrations in the fluid at rest in conduit 10a and v is the rate of flow of the fluid in said conduit, and a is the distance between stations as previously explained. The other part is represented by a constant K, K being the time required for the vibrations to traverse that part of the path not included in the distance a, said time being therefore independent of the rate of flow of the fluid in conduit 10a. Adding up the two parts we procure the equation $$X = \frac{a}{V-v} + K$$

Likewise the time required for the vibrations to travel over the course through station Ca will also be made of two parts and will be indicated as follows:

$$Y = \frac{a}{V+v} + K$$

solving for v we find the velocity of the fluid as equal to $$v = \frac{a}{2}\left\{\frac{1}{Y-K} - \frac{1}{X-K}\right\} = \frac{a}{2}\left\{\frac{X-Y}{(X-K)(Y-K)}\right\}$$

Since K is a constant which may be made small by properly designing the apparatus, a large error in the calculation of K will result in a small error in the computed velocity v. K may therefore be determined sufficiently accurately by direct measurement of the distance from the junction point 215 to receivers 174 and 51a and in subtracting from this distance the distance a and then dividing the remainder subdivided into sections containing different media by the velocity of vibrations in the different media respectively. Since X and Y are procured by direct measurement and since the temperature of the tubes 165, 167 and 168 is maintained constant, the velocity of the gas or fluid may be determined independently of the rate of propagation of vibrations in the fluid at rest whose rate of flow is to be measured.

My invention is highly advantageous in that the apparatus is extremely sensitive and minute differences in time may be accurately measured thereby, whereby velocities may be accurately determined. By means of the construction and method employed the arrival of the wave front is used for the purpose of measurement of velocities or rates of flow so that reflections of vibrations which might occur in the conduit or pipe and in any of the parts of the apparatus have no effect. The operation of the invention does not rely upon sonorous effects making it very easy to operate the apparatus. The apparatus of my invention is extremely simple and the method thereof easily carried out.

Changes in the specific form of my invention, as herein disclosed, may be made within the scope of what is claimed without departing from the spirit of my invention.

Having described my invention, what I claim as new and desire to protect by Letters Patent is:

1. In a fluid meter, means providing two paths along which mechanical vibrations may travel, one of said paths being in the fluid whose velocity is to be measured, means for initiating mechanical vibrations and causing them to travel along both of said paths, means for varying the length of one of said paths, and means for indicating when the vibrations reach certain stations along said paths in the same length of time.

2. In a fluid meter, a vibration detecting device adapted to be actuated upon arrival of a wave front at said device, actuating means operated thereby, a second vibration detecting device adapted to be actuated upon arrival of a wave front at said device, actuating means operated by said second vibration detecting device, indicating means operated by either of said actuating means, and means functioning upon actuation of one of said actuating means, for preventing operation of the other of said actuating means.

3. In a fluid meter, a vibration detecting device, adapted to be actuated upon arrival at said device of the wave front of a wave traveling in one direction, a second vibration detecting device adapted to be actuated upon arrival at said device of the wave front of a wave traveling in another direction, indicating means adapted to indicate upon operation of either of said detecting devices, and means actuated upon actuation of one of said detecting devices for preventing operation of said indicating means when the other of said detecting devices is actuated.

4. In a fluid meter, a conduit along which the fluid travels, means for initiating in the fluid in said conduit mechanical vibrations, means for determining the arrival of the vibrations at two localities, and means for measuring the difference in length of the two paths over which the vibrations travel in the same time.

5. In a fluid meter, a conduit along which the fluid travels, means separate from said conduit and containing a fluid, whose state of motion and inherent characteristics are known, means for simultaneously initiating in both of said fluids mechanical vibrations, a vibration detecting device connected to said conduit, a second vibration device connected to the means containing the second fluid, and means for determining priority of operation of said detecting devices.

6. In a fluid meter, two gas filled triode tubes, parallel circuits including the plates of said tubes, said circuits having a common return to the filaments thereof, indicating means connected to said circuits and adapted to indicate in which of said parallel plate circuits current is flowing, a resistance and a source of E. M. F. in said common return, separate circuits including the grids of said tubes, and separate vibration detecting devices in said grid circuits, said vibration detecting devices functioning independently to vary the E. M. F. in said grid circuits.

7. In a fluid meter, a conduit along which the fluid travels, means for initiating in the fluid in said conduit mechanical vibrations, a vibration detecting device connected to said conduit on the upstream side of said first named means, a second vibration detecting device connected to said conduit on the downstream side of said first named means, two gas filled triode tubes, parallel circuits including the plates of said tubes, said circuits having a common return to the filaments thereof, indicating means connected to said circuits and adapted to indicate in which of said parallel plate circuits current is flowing, a resistance and a source of E. M. F. in said common return, circuits including the grids of said tubes, said vibration detecting devices operating to vary the E. M. F. in said grid circuits.

8. In a fluid meter, a conduit along which the fluid travels, means separate from said conduit and containing a fluid, whose state of motion and inherent characteristics are known, means for simultaneously initiating in both of said fluids mechanical vibrations, a vibration detecting device connected to said conduit, a second vibration device connected to the means containing the second fluid, two gas filled triode tubes, parallel circuits including the plates of said tubes, said circuits having a common return to the filaments thereof, indicating means connected to said circuits and adapted to indicate in which of said parallel plate circuits current is flowing, a resistance and a source of E. M. F. in said common return, circuits including the grids of said tubes, said vibration detecting devices operating to vary the E. M. F. in said grid circuits.

9. The method of determining the rate of flow of fluids which consists in initiating mechanical vibrations in the fluid whose rate of flow is to be determined and in a medium of known characteristics, the vibrations in said fluid traveling along a path extending in the direction of flow of the fluid and along another path in said fluid extending in the opposite direction, in measuring the difference in the distances traveled by the vibrations in equal intervals of time along one of the paths in the fluid and along a path in the medium of known characteristics, in measuring the difference in the distances traveled by the vibrations in equal intervals of time along the other path in the fluid and along a path in the medium of known characteristics, and in ascertaining the rate of flow therefrom.

10. The method of determining the rate of flow of fluids which consists in initiating mechanical vibrations simultaneously in the fluid whose rate of flow is to be measured and in a medium having known characteristics, in measuring and comparing the distances traveled by the wave front of the initiated vibrations along two paths in the same length of time, one path being in the fluid whose rate of flow is to be determined and the other in said medium, and in ascertaining the rate of flow therefrom.

HENRY E. HARTIG.